(12) United States Patent
Lai et al.

(10) Patent No.: US 8,293,399 B2
(45) Date of Patent: Oct. 23, 2012

(54) CELL CONNECTOR

(75) Inventors: Shih-Po Lai, Tu-Cheng (TW);
Sheng-Hao Cheng, Tu-Cheng (TW);
Ta-Chang Yang, Tu-Cheng (TW);
Po-Laung Huang, Tu-Cheng (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 795 days.

(21) Appl. No.: 12/471,313

(22) Filed: May 22, 2009

(65) Prior Publication Data
US 2010/0297492 A1 Nov. 25, 2010

(51) Int. Cl.
*H01M 2/26* (2006.01)
*H01M 2/28* (2006.01)
*H01M 2/08* (2006.01)
*H01M 2/24* (2006.01)

(52) U.S. Cl. ......... 429/161; 429/162; 429/158; 429/185

(58) Field of Classification Search .................. 429/178, 429/161, 162, 158, 185
See application file for complete search history.

(56) References Cited

U.S. PATENT DOCUMENTS

| 6,037,559 | A  | * | 3/2000 | Okabe et al. | 219/91.23 |
| 6,267,790 | B1 | * | 7/2001 | Daroux et al. | 29/623.2 |
| 7,037,621 | B2 | * | 5/2006 | Kikuchi et al. | 429/211 |

* cited by examiner

*Primary Examiner* — Helen O Conley
(74) *Attorney, Agent, or Firm* — Lin & Associates IP, Inc.

(57) ABSTRACT

A cell connector adapted for electrically connecting at least one cell includes a plate-shaped connecting member made of metal material with high conductivity, and at least one welding member mounted on the connecting member for being welded with the cell. The welding member is made of weldable metal solder. The connecting member has a lower resistivity than the welding member. Therefore, the cell connector of the present invention not only is easily welded, but also can reduce the energy loss thereon, and moreover, the cost is also advantageously reduced.

10 Claims, 5 Drawing Sheets

CELL CONNECTOR

BACKGROUND OF THE INVENTION

1. Field of the Invention

The present invention relates to an electrical connector, and more particularly to a cell connector.

2. The Related Art

With the development of electronic technology, cells have been popularly used in our daily life for facilitating the using of electronic products. In order to meet power demands of the electronic products, a battery module is formed by series-parallel connection of a plurality of cells to supply power for the electronic products, wherein an electrical connection between the corresponding two cells is achieved by means of a cell connector. Traditionally, the cell connector is made by means of punching a nickel plate and is of strip shape. Two ends of the cell connector are respectively welded to a positive electrode of one cell and a negative electrode of the other cell so as to form the electrical connection between the two cells. However, the nickel material has a high resistivity that results in a great energy loss on the cell connector. One method of solving the foregoing problem is by increasing the thickness of the cell connector so as to reduce resistance of the cell connector. However, that results in an increase of the cost and an inconvenient welding between the cell connector and the cell. Therefore, a cell connector capable of overcoming the foregoing problems is required.

SUMMARY OF THE INVENTION

An object of the present invention is to provide a cell connector adapted for electrically connecting at least one cell. The cell connector includes a plate-shaped connecting member made of metal material with high conductivity, and at least one welding member mounted on the connecting member for being welded with the cell. The welding member is made of weldable metal solder. The connecting member has a lower resistivity than the welding member. Therefore, the cell connector of the present invention not only is easily welded, but also can reduce the energy loss thereon, and moreover, the cost is also advantageously reduced.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
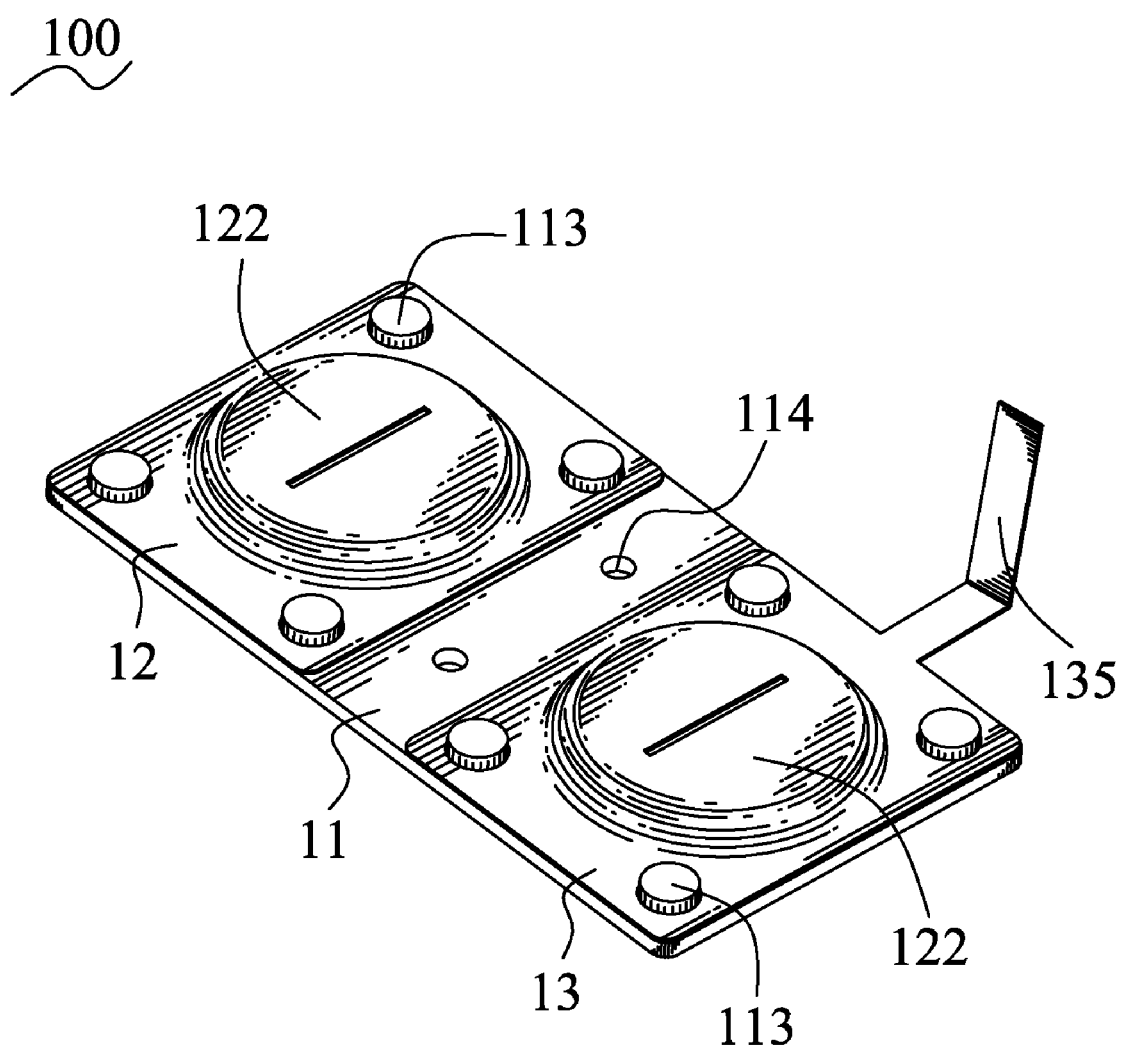
FIG. 1 is a perspective view of a cell connector according to a first embodiment of the present invention.
Figure 2:
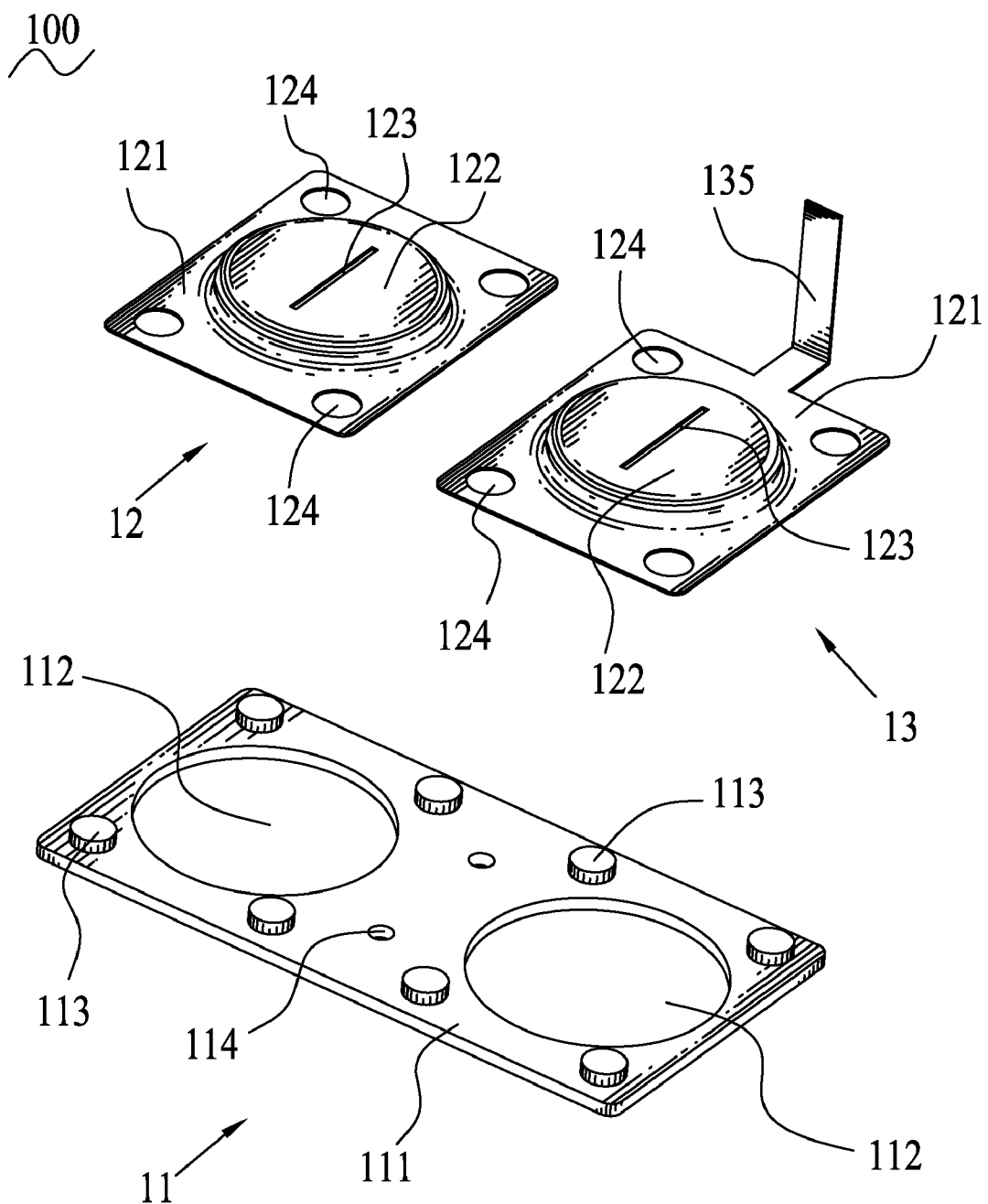
FIG. 2 is an exploded view of the cell connector of FIG. 1.

Referring to FIG. 1 and FIG. 2, a cell connector 100 according to a first embodiment of the present invention includes a connecting member 11, a first welding member 12 and a second welding member 13.

Referring to FIG. 2 again, the connecting member 11 is made by means of punching a copper plate with high conductivity and has a flat rectangular base board 111. Two ends of the base board 111 respectively define a round welding opening 112 penetrating therethrough. The two ends of the base board 111 are further punched upward to respectively form a plurality of cylindrical fixing lumps 113 located orderly around the corresponding welding opening 112. A middle of the base board 111 defines two fixing holes 114 located between the two welding openings 112.

In FIG. 2, the first welding member 12 and the second welding member 13 are respectively made by means of punching a nickel plate with a good welding performance. The first welding member 12 has a flat square base plate 121. A center of the base plate 121 is punched upward to form a flat round welding plate 122 beyond a top of the base plate 121 and corresponds to the welding opening 112 of the connecting member 11. A middle of the welding plate 122 defines a blocking slot 123 penetrating therethrough for enhancing the welding performance thereof. The base plate 121 further defines a plurality of fixing apertures 124 penetrating therethrough and located orderly around the welding plate 122 for engaging with the corresponding fixing lumps 113 of the connecting member 11. The second welding member 13 has a similar structure to the first welding member 12. Comparing to the first welding member 12, the difference is that the second welding member 13 further has an L-shaped detecting strip 135 extending from a middle of an edge of the base plate 121.

Referring to FIG. 1 again, when the cell connector 100 is assembled, the welding members 12, 13 are mounted on the two ends of the connecting member 11 and cover the corresponding welding openings 112. The welding plate 122 faces the corresponding welding opening 112. The fixing lumps 113 are riveted in the respective fixing apertures 124 so as to firmly fix the corresponding welding members 12, 13 on the connecting member 11. The fixing holes 114 are exposed between the first welding member 12 and the second welding member 13.

Figure 3:
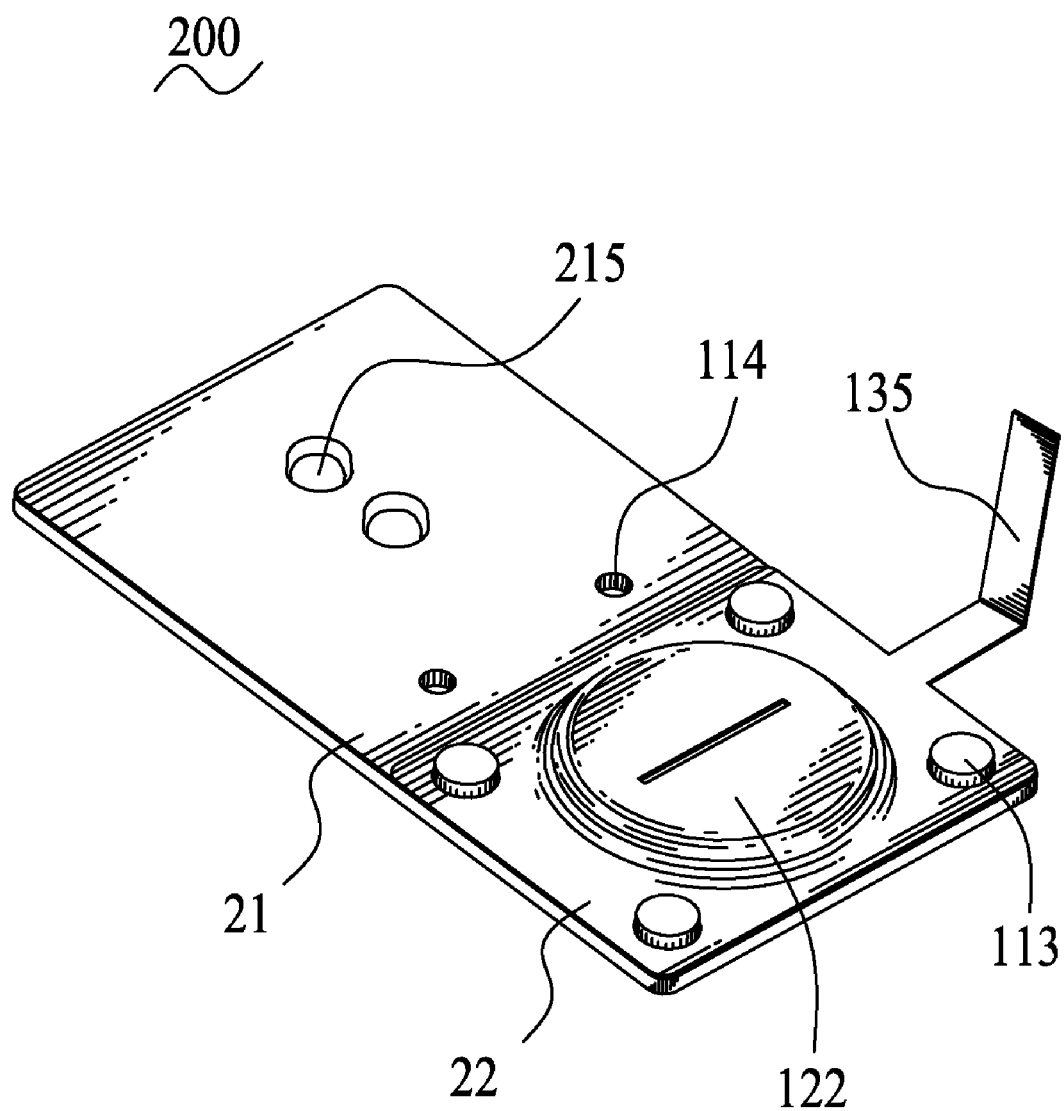
FIG. 3 is a perspective view of a cell connector according to a second embodiment of the present invention.
Figure 4:
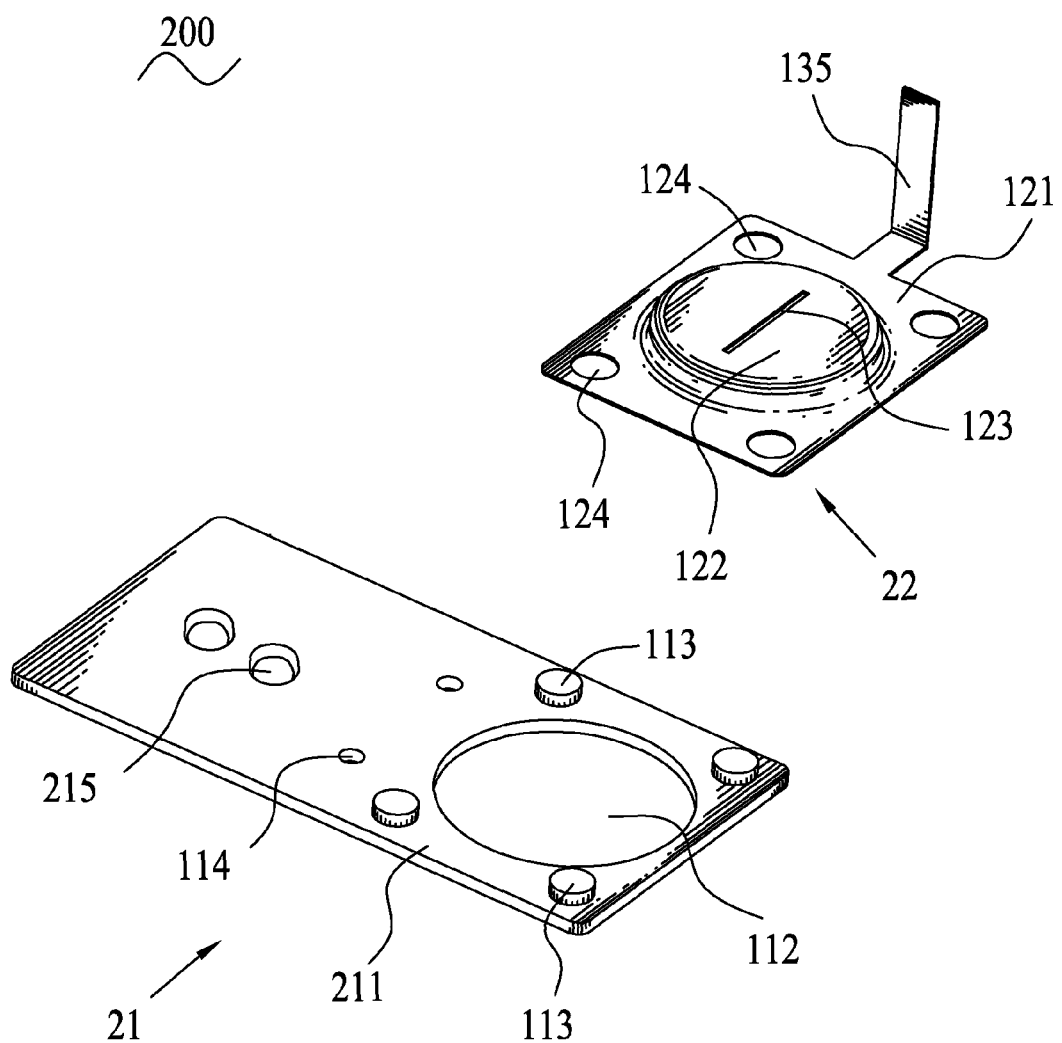
FIG. 4 is an exploded view of the cell connector of FIG. 3.

Referring to FIG. 3 and FIG. 4, a cell connector 200 according to a second embodiment of the present invention is shown. The cell connector 200 includes a connecting member 21 and a welding member 22. Comparing to the first embodiment, the connecting member 21 is slightly different from the connecting member 11 of the first embodiment. The difference is that a base board 211 of the connecting member 21 defines two fixing perforations 215 at one end thereof instead of one welding opening 112 and the corresponding fixing lumps 113 around the replaced welding opening 112 of the first embodiment. The welding member 22 has a same structure with the second welding member 13 and is not described in detail anymore.

Figure 5:
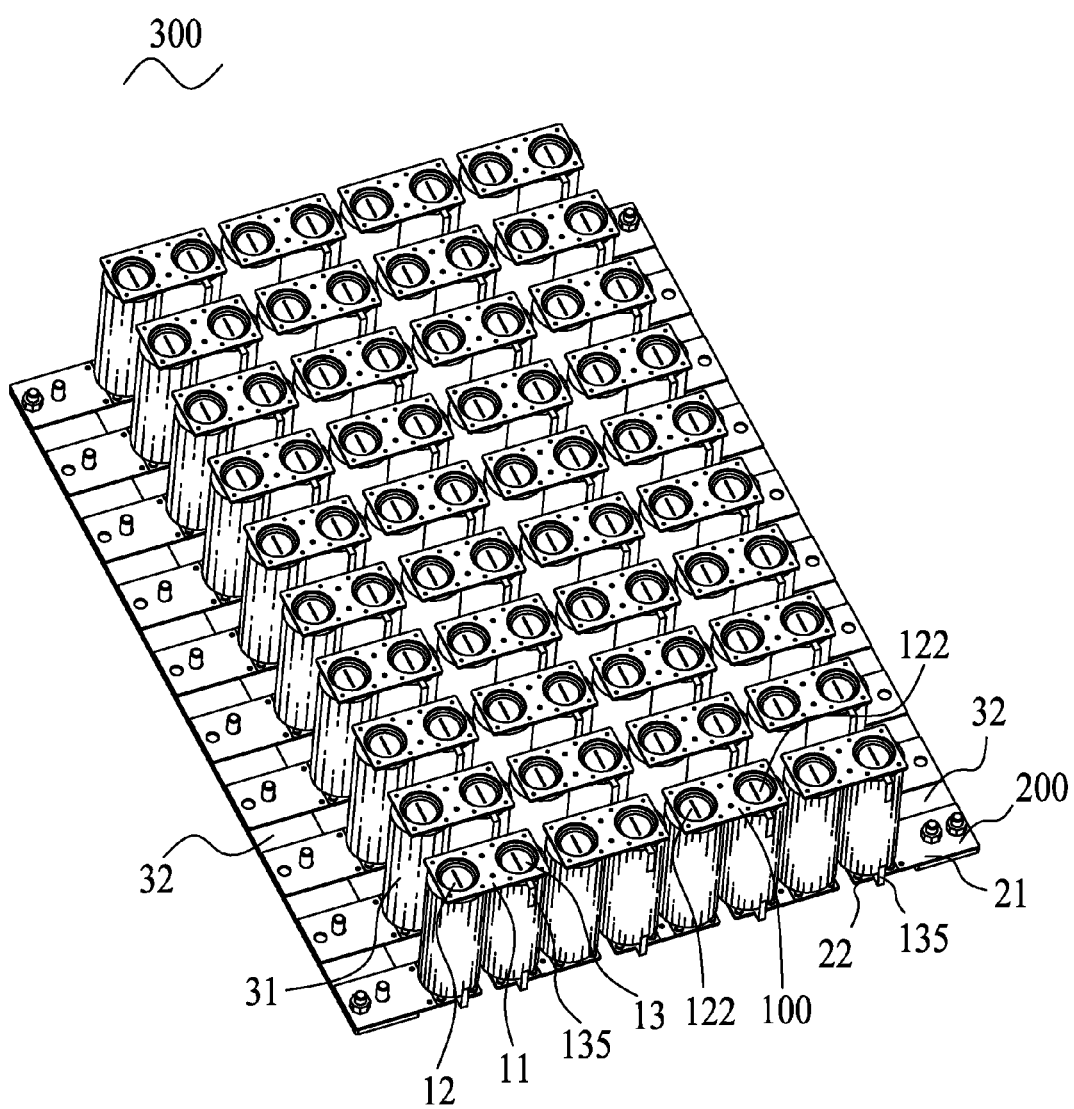
FIG. 5 is a perspective view showing that the cell connectors of FIG. 1 and FIG. 3 are used for a power battery module.

FIG. 5 is a perspective view showing that the cell connectors 100, 200 are used for a power battery module 300. The power battery module 300 includes a plurality of series-parallel cells 31 and a pair of Cu bus 32. The cells 31 are firstly series-connected by means of the cell connectors 100 to form a plurality of battery units (not labeled), and then the battery units are parallel-connected between the pair of Cu bus 32 by means of the cell connectors 200, wherein the two welding plates 122 of each of the cell connectors 100 are welded to a positive electrode of one cell 31 and a negative electrode of another cell 31 so as to form an electrical connection between the two cells 31, and the welding plate 122 of the welding member 22 of each of the cell connectors 200 is welded to a positive electrode or a negative electrode of the outmost cell 31 of the corresponding battery unit and the cell connector 200 is further electrically fixed to the corresponding Cu bus 32 by means of at least one fixing perforation 215. When welding the cell 31 to the cell connector 100, 200, a welding appliance (not shown) can be easily operated for the welding by means of the fixing holes 114, and furthermore, a current can flow from one part of the welding plate 122 to the other part through an electrode surface of the corresponding cell 31 due to the blocking slot 123 so as to thermalize the electrode surface for facilitating the welding between the cell 31 and the welding plate 122. The detecting strip 135 is exposed on an outside of the corresponding cell 31 to generate a potential of the cell 31 that facilitates a user to check the power battery module 300.

As described above, the welding member 12, 13, 22 is made of nickel material that facilitates the welding between the welding plate 122 and the cell 31, and the connecting member 11, 21 is made of copper material which has a higher conductivity and a lower resistivity than the nickel material so as to reduce an energy loss thereon. Therefore, the cell connectors 100, 200 formed by the combination of the nickel welding members 12, 13, 22 and the copper connecting members 11, 21 not only are easily welded, but also can reduce the energy loss thereon, and moreover, the cost is also advantageously reduced.

The foregoing description of the present invention has been presented for purposes of illustration and description. It is not intended to be exhaustive or to limit the invention to the precise form disclosed, and obviously many modifications and variations are possible in light of the above teaching. For example, the first welding member 12 further has an L-shaped detecting strip extending from a middle of an edge of the base plate 121, and the welding members 12, 13, 22 are mounted on the connecting members 11, 21 through other means, such as buckling means or welding means etc. Such modifications and variations that may be apparent to those skilled in the art are intended to be included within the scope of this invention as defined by the accompanying claims.

What is claimed is:

1. A cell connector adapted for electrically connecting at least one cell, comprising:
    a connecting member of a plate shape made of metal material with high conductivity, the connecting member having at least one welding opening penetrating therethrough and the welding opening being surrounded by a plurality of fixing lumps protruded from the connecting member; and
    at least one welding member mounted on the connecting member for being welded with the cell, the welding member being made of weldable metal solder, the connecting member having lower resistivity than the welding member;
    wherein each of the at least one welding member has a base plate punched upward opposite to the connecting member to form a welding plate facing and covering a corresponding welding opening of the connecting member and welded with the cell, and the base plate defines a plurality of fixing apertures penetrating therethrough and located around the welding plate for engaging with the fixing lumps surrounding the corresponding welding opening.

2. The cell connector as claimed in claim 1, wherein the connecting member is made of copper material, and the welding member is made of nickel material.

3. The cell connector as claimed in claim 1, wherein the at least one welding opening includes a first welding opening and a second welding opening respectively formed on first and second ends of the connecting member, and the at least one welding member includes a first welding member and a second welding member mounted on the connecting member and covering the corresponding welding openings.

4. The cell connector as claimed in claim 1, wherein the welding member further has an L-shaped detecting strip extended from an edge of the base plate for being exposed on an outside of the cell.

5. The cell connector as claimed in claim 1, wherein a middle of the welding plate defines a blocking slot penetrating therethrough for enhancing welding performance thereof.

6. The cell connector as claimed in claim 1, wherein the shape of the welding plate and the welding opening is round.

7. The cell connector as claimed in claim 1, wherein the welding member is riveted on the connecting member by means of the fixing lumps and the fixing apertures.

8. The cell connector as claimed in claim 1, wherein the at least one welding opening comprises one welding opening formed on a first end of the connecting member, and a second end of the connecting member defines a plurality of fixing perforations.

9. The cell connector as claimed in claim 8, wherein the welding member further has an L-shaped detecting strip extended from an edge of the base plate for being exposed on an outside of the cell.

10. The cell connector as claimed in claim 9, wherein a middle of the welding plate defines a blocking slot penetrating therethrough for enhancing welding performance thereof.

* * * * *